Jan. 16, 1968 F. B. HUNTER, JR 3,363,676
ROTATING HEAT EXCHANGER
Filed Oct. 5, 1964 2 Sheets-Sheet 1

INVENTOR.
FRANK B. HUNTER JR
BY
Stuart W. Wohlgemuth
ATTORNEY

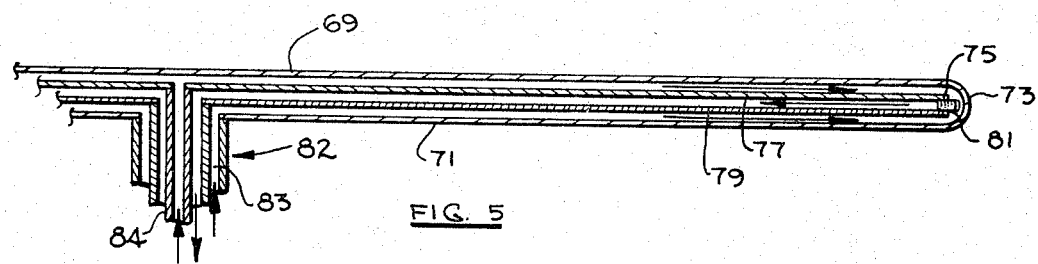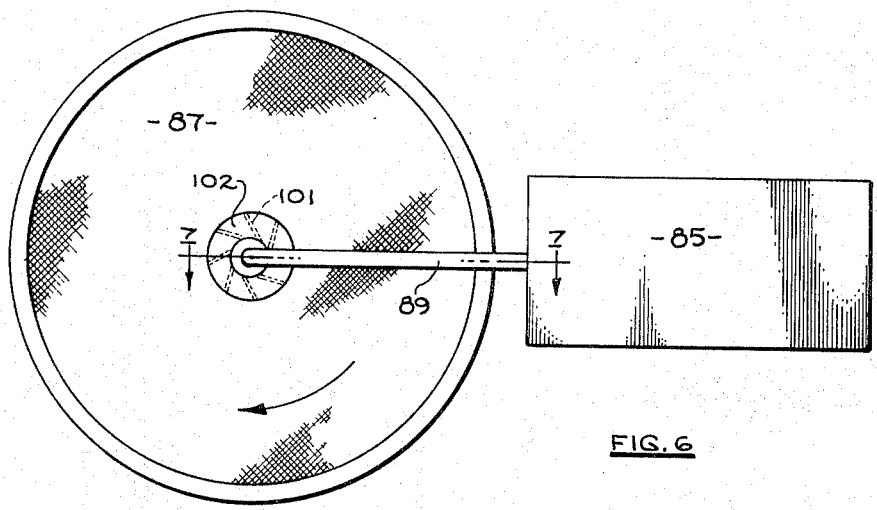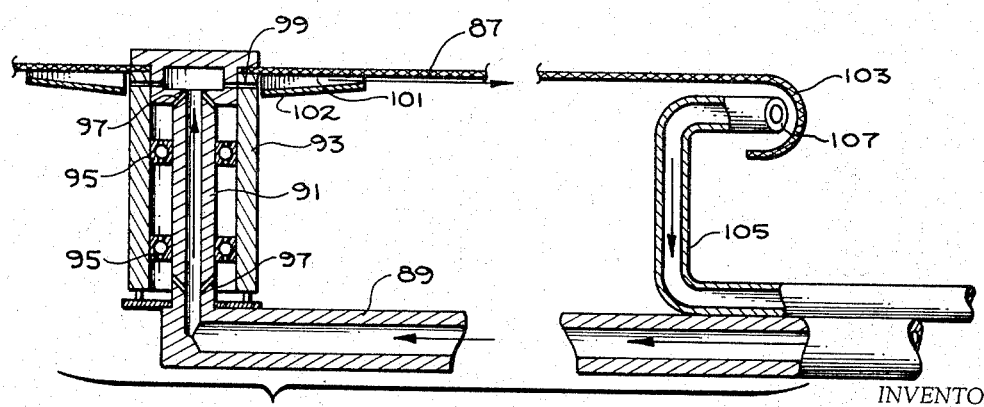

United States Patent Office 3,363,676
Patented Jan. 16, 1968

3,363,676
ROTATING HEAT EXCHANGER
Frank B. Hunter, Jr., Woodland Hills, Calif., assignor to North American Aviation, Inc.
Filed Oct. 5, 1964, Ser. No. 401,393
11 Claims. (Cl. 165—86)

This invention relates to a heat radiator. More particularly the invention relates to a device for radiation of heat utilizing liquid metal or other liquid coolant.

For outer space applications, such as space stations or long duration missions, large power sources are required. Such sources include, for example, a nuclear reactor or various steam generating means to drive turbines. As is normal in most power generating devices, coolant is required to remove the excess heat generated. In outer space particularly, the means have to be provided for removing the heat from the cooling means used to cool a nuclear reactor or other source. One such device for removing the heat from a source and radiating it to the outer space is disclosed in co-pending application Ser. No. 100,171, filed Apr. 3, 1961, and now Patent No. 2,158,198 by the same invention. In the co-pending application a revolving belt is utilized which is in contact with the heat exchanger to which the coolant for the power source is directed. The belt, thus by conduction, removes the heat from its contact with the heat exchanger and carries the heat to space as it revolves away from the heat exchanger and radiates this heat to the outer space, as well as transmits heat by way of conduction and convection. The herein invention is believed to provide certain additional advantages over the co-pending application as well as some different features.

For outer space application particularly, several problem areas are presented in the design of a heat radiator. It is important that devices in outer space do not require bearings running at high temperatures with positive lubrication. Generally such positive lubrication in a vacuum as is found in outer space is difficult to achieve. The weight of the radiator device is also quite critical in outer space applications for quite obvious and apparent reasons. A unit should have minimum weight as a primary objective so as to reduce load requirements. A further important criteria for space radiators is that they are not affected by meteoric damage in pitting or punctures. The radiators must be able to sustain some such damage without affecting their ability to perform their desired function. Further, the radiator must be capable of storage in the package of the missile prior to deployment. Another design consideration of importance is the minimization of power requirements. If a liquid is used as a cooling medium, it is desirable to minimize the energy needed to pump the fluid through the heat exchanger.

It is an object of this invention to provide a novel radiation system utilizing liquid metal.

Another object of this invention is to provide a radiator system light in weight.

Further objects of this invention are to provide a radiator system for outer space applications that is not readily damaged by meteorites and other objects.

One further object of this invention is to provide a radiator system which has high reliability for years of continuous operation.

A still further object of this invention is providing radiator system utilizing liquid metal wherein the energy for pumping the liquid metal is minimized. Other objects will become apparent from the following detailed description.

The radiator system of this invention utilizes a liquid metal such as tin as the coolant fluid. The liquid metal, or tin, is pumped through the heat exchanger of the system utilizing the radiator. Upon the absorption of the heat from the exchanger, the tin is directed upon a large disc at the center thereof. Motor or other similar means is provided for the continual rotation of the disc. Thus as the liquid metal impinges upon the center of the disc, centrifugal force carries the metal to the outer circumference thereof. The film coefficient enables the liquid metal to adhere to the surface of the disc as it travels to the outer circumference. At the outer circumference a collector is present to collect the liquid metal that has accumulated there and carry it back to the heat exchanger. By spreading the liquid metal thinly over the large disc, in its travel from the center to the outer circumference, most of the heat absorbed by the liquid metal will be dissipated by radiation directly or by conduction to the disc and then radiated to the outer space environment. Since tin, if such is used, generally has a low coefficient of radiation, the metal can be directed between two thin sheets comprising the disc, the two sheets being of an excellent radiating material, e.g., an oxidized surfaced stainless steel or tungsten so that the heat can be radiated more effectively. The coefficient of conductive heat transfer from the metal to the radiating discs is relatively high and most satisfactory for quickly transferring the contained heat in the liquid metal to the radiating surfaces. The centrifugal force upon the liquid metal serves as a pump in that it drives the metal into the collector and the rotative velocity drives the metal back to the heat exchanger. The bearings on the shaft upon which the disc rotates are lubricated by the liquid metal used as the coolant medium, thus they can effectively operate in an outer space environment.

It is believed that the invention will be better understood from the following detailed description and drawings in which:

FIG. 1 is a sectioned pictorial diagrammatic view of a system incorporating the radiator of the invention.

FIG. 2 is a cutaway view taken along lines 2—2 of FIG. 1.

FIG. 3 is a rear view of FIG. 2 taken along lines 3—3 of FIG. 1.

FIG. 4 is a sectioned pictorial view of a modification of the radiator element shown in FIG. 1.

FIG. 5 is a sectioned view of a further modification of the radiator element of the invention.

FIG. 6 is a pictorial view of a heat exchanger and liquid metal radiator of one other embodiment of the invention.

FIG. 7 is a detailed side view of the radiator arrangement of the device disclosed in FIG. 6 taken along line 7—7 of FIG. 6.

With reference now particularly to FIG. 1, there is shown a pictorial diagrammatic representation of a system incorporating the radiator concept of this invention. The figure is utilized particularly to show the flow of materials and the principle of operation rather than the specific details of a fixed arrangement. Disclosed is a heat exchanger 11 which can be of any conventional construction. As shown, the heat exchanger has therein, a plurality of tubes 13 through which the coolant fluid is directed. An inlet 15 and outlet 17 are provided for admitting and exiting the working fluid from the heat exchanger. Arrows indicate the path of the working fluid through the baffling and tubes of the heat exchanger. It is this heated fluid travelling through the exchanger from which the heat is desired to be removed by the radiator of the invention. Thus, vapor from a turbine or like power supply will enter at 15 and leave as a condensate through exit line 17. In this example, tin will be used as the liquid metal coolant. A make-up tank 19 provided with heating means, not shown, serves to heat the tin above the melting point so as to reach a liquid state before the device can operate. Tank 19 may be in a sump or other device for supplying any make-up and may feed directly into a liquid tin return line 21. In the diagram there are two liquid return lines shown, 21 as previously indicated and 23. Often a plurality of such return lines may be present. Auxiliary heaters may be provided to heat the metal flow lines if such is necessary during any shut-down or restart so as to reliquify any residual metal in the flow paths.

A liquid tin pump 25 is disposed at the intersection of the two return lines 21 and 23 and serves to pump the tin through the system. The liquid tin is pumped from the pump 25 through the heat exchanger 11, passing through tubes 27 provided therein. The liquid tin thus absorbs the heat from the turbine vapor as it passes through the tubes of the heat exchanger. The liquid tin leaving the heat exchanger passes through a hollow shaft 29 affixed to the end of the heat exchanger. The shaft 29 is entirely closed at its forward end 31 save for outlet nozzles 33. Disposed concentrically about the shaft is a rotor hub 35 which rides on the shaft by means of bearings 37. Additional nozzles 39 are provided in the walls of the hollow portion of the shaft 29 directed to the bearings 37, thus tin passing through nozzles 39 will serve to continually lubricate the bearings 37. Rigidly affixed to the rotor hub 35 is a flat disc 41 which serves as the radiating surface for the flowing tin. The disc may, for example, be of a woven metallic fabric compatible with tin, or be constructed of tin alloy or various other good radiating materials. At the forward end of the stationary shaft 29, there is provided a threaded portion 43 upon which a nut 45 is secured and serves to hold the rotor hub 35 in position about the shaft 29. Disposed medially about the outer circumference of the rotor hub portion is a grooved surface 47. A motor 49 drives a belt 51, for example, which engages the grooved surface 47 and serves to rotate the rotor hub 35 above the shaft 29. Thus, since disc 41 is rigidly affixed to rotor hub 35, rotation thereof causes the disc to continually rotate with the hub.

A collector ring 49 situated at the periphery of the disc 41, shown in FIGS. 2 and 3, is affixed to the disc by a plurality of brackets 51. As can be seen, the collector ring is a U-shaped member whose sides serve to enclose the end of the disc and the liquid tin return lines 21 and 23. As particularly shown in FIG. 2, it can be seen that the ends or pick-up nozzles 53 of the liquid tin return lines are parallel to the surface of the disc 41 and are directed counter to the rotational direction of the disc. Thus, in operation the liquid tin emitted through the nozzles 33 will pass on both sides of the rotating disc 41 and will adhere thereto by the film coefficient. Due to the rotation of the disc, the centrifugal force thereof will cause the tin to flow to the outer periphery and then radially off into the collector ring 49. The ends or pick-up nozzles 53 of the return lines are emersed to a partial degree in the molten tin contained in the collector ring. The circumferential velocity of the liquid tin at this point is converted into a pressure head forcing the now cooled liquid tin to return to the pump 25 shown by the arrows in FIG. 1. It should be pointed out that a pump may not be needed for other than start-up purposes if the rotary speed of the disc 41 matches the pressure recovery of the pick-up nozzles 53 and system pressure drop. In this instance, the conversion of the circumferential velocity to pressure head will serve to continually pump the tin throughout the system. As can be seen, and was explained with relation to FIG. 1, the liquid tin will lose heat by radiation from both sides of the rotating disc in the particular embodiment described. The other views will disclose embodiments for additional various means for projecting the liquid tin about radiating surfaces.

Control of the system may be affected typically in two ways. Pump 25 may be controlled in speed so as to maintain a tin flow such that the heat absorbed through the exchanger is sufficient to cool the power generation system working fluid. Alternatively, the speed of the driven discs may be varied to vary the centrifugal speed at which the metal traverses the discs from the inner portion to the outer periphery, thus controlling the amount of heat being rejected to the space environment.

Since liquid tin, for example, does not have a relatively high emissivity, it may be desirable to project the tin between two thin rotating discs as shown in FIG. 4. Two thin discs 55 and 57, are shown rotatably disposed above a stationary shaft 59, corresponding in function to shaft 29. In this embodiment, nozzles are not disposed in the shaft 59 for spraying the material upon the surfaces. Rather the liquid tin passes through the end 61 of the stationary shaft and fills a reservoir 63 formed about the end of the shaft by an enclosure 65 that is permanently affixed to the disc 55. The discs 55 and 57 can be coated with a high emissivity material such as zinc oxide, platinum black or oxidation of the basic material. Thus the relatively low emissivity of the tin, a favorably characteristic to prevent loss by evaporation, can be compensated for by the high emissivity coating on the surfaces of the disc.

Turning now to FIG. 5, there is shown a further embodiment utilizing counter-rotating discs. There is shown an outer pair of two parallel discs 69 and 71, joined together and enclosed at their periphery 73. Between discs 69 and 71 are disposed two parallel discs 77 and 79 which are open at their outer most end 81. All of the discs extend perpendicular at the center thereof, forming a hub 82, and maintaining the same distance between each surface throughout the hub extension. As seen from the arrows, the hot liquid tin enters in two places, between the perpendicular extension 84 of the walls 77 and likewise between the extensions of the walls 71 and 79 through passage 83. Thus, the liquid tin is caused to flow about the inner disc members 77 and 79 which are rotating together in one direction as a unit. The tin is picked up at the outer end 73 and returned between the discs 77 and 79 in passage 81 back to the system. The discs 77 and 79 are rotating in a direction oppositely to that of discs 69 and 71, thus the torque reactions involved are made to balance out. It is pointed out, though not shown in detail in FIG. 5, that the end 81 of the inner assembly is provided with turning vanes in the manner of a radial inflow turbine blade, so as to facilitate the pick-up of the tin as the two members are counter-rotating in much the same manner as shown in FIGS. 1 and 2.

FIGS. 6 and 7 disclose an embodiment whereby the disc is easily foldable for storage in flight prior to deployment. The heat exchanger and other equipment is graphically depicted as a box 85 in FIG. 6. The disc 87 may be folded around liquid metal feed line 89 and constrained by a separable aerodynamic shield, and deployable upon separation of the shield by its inherent seeking of its formed shape. The disc will be further stabilized by centrifugal force as it is rotated. The details of the device are better shown with reference now to FIG. 7. The hollow feed line 89 extends from the heat exchanger 85 in a plane parallel to that of the surface of the disc 87. Where the feed line 89 intersects the center line of the disc, an extension 91 normal thereto is provided. A rotor hub 93 to which the disc 87 is affixed surrounds the extension 91 and is separated therefrom by bearings 95. Nozzle apertures 97 are provided in the walls of the extension 91 so as to lubricate the bearings 95 through liquid metal being sprayed thereon. At the end of the extension, nozzles 99 are provided for the outlet of the main flow of the liquid tin. The nozzles 99 are directed against angularly disposed baffles 101 which are rigidly affixed to the underside of the flat disc 87. A shallow conical shroud 102 is provided for confining the flowing liquid and directing the liquid to the underside of the disc surface. Six such baffles are shown in FIG. 6 by way of example only. These baffles, due to their angular displacement, thus will cause the rotation of the disc upon impingement of the tin thereupon. As previously described due to the rotation of the disc, centrifugal force will cause the tin to flow along the surface of the disc 87 to the end thereof. The end of the disc is curved in a U-shape 103 so as to retain the tin in a manner similar to the collector ring previously described in FIG. 1. Only one pick-up is provided at the end of the disc closest to the heat exchanger. The pick-up and return line 105 has a nozzle end portion 107 which is directed counter to the rotation of the disc in the manner previously described with the pick-up nozzle of the other embodiments. Thus, tin is collected entirely about the curved portion 103 of the disc 87 and is retained therein due to the centrifugal force. It is then picked up at the nozzle 107 and returned to the heat exchanger. Due to the one pick-up and the construction involved, the disc is foldable for inflight applications. As previously indicated, one of the materials which can be utilized for the construction of the disc, is a woven fabric. The discs may be made of other materials such as plastics when the temperature range of operation is compatible. Such a fabric can of course be relatively rigidly constructed in the region of the collector portion 103, yet be flexible enough that it may be folded during inflight application. Upon deployment, the tin directed against the baffles 101 will start the rotation of the disc causing the system to operate. While the above explanation has been made in terms of liquid tin, other liquid metals such as gallium and lead and other liquids having relatively low vapor pressures and low viscosity at the temperature of operation, such as diffusion pump oils, for example, of the silicone, mineral or vegetable oil type, may be employed.

Although the invention has been described and illustrated in detail, it is to be clearly understood that the same is by way of limitation, the spirit and scope of this invention being limited only by the terms of the appended claims.

I claim:
1. A radiator utilizing liquid comprising:
at least one circular disc,
means for rotating said disc,
means for directing liquid adjacent the center portion of said disc, whereby said liquid is directed along the surface of said disc to the outer periphery thereof by centrifugal force only as a thin film adherent to the surface of said disc, said liquid being exposed to ambient conditions,
and means for removing said liquid from the periphery of said disc.
2. The device of claim 1 having two of said discs spatially displaced and parallel to one another wherein said liquid metal is directed between said discs.
3. The device of claim 1 additionally comprising means for collecting said liquid metal at the outer periphery of said disc.
4. The device of claim 1 wherein said means for rotating said disc comprises:
a plurality of baffles normal to said disc disposed about the center thereof,
whereby said liquid metal directed against said plates causes rotation of said disc.

5. The device of claim 1 comprising:
a first pair of discs,
a second pair of discs disposed within said first pair with the surfaces of all of said discs substantially parallel,
means for counter-rotating said pairs of discs,
and means for ejecting said liquid metal between said first pair and said second pair of discs.
6. The device of claim 5 where said first pair of discs are joined at their outer periphery thereby enclosing said second pair of discs.
7. In combination:
a heat exchanger utilizing liquid as the coolant fluid,
a radiator for radiating the heat absorbed by said liquid, said radiator comprising:
at least one circular disc,
means for rotating said disc,
means for directing liquid to surface of said disc adjacent the center thereof,
whereby said liquid is directed along the surface of said disc to the outer periphery thereof by centrifugal force only as a thin film adherent to the surface of said disc, said liquid being exposed to ambient conditions,
and means for removing said liquid from the periphery of said disc.
8. A heat exchange system comprising:
a heat utilizing liquid as the coolant fluid,
at least one circular disc disposed adjacent said heat exchanger,
means for directing said fluid from said heat exchanger to said disc adjacent the center thereof,
means for rotating said disc,
means for directing said fluid to the surface of said disc,
whereby said fluid is directed along the surface of said disc to the outer periphery thereof by centrifugal force only as a thin film adherent to the surface of said disc, said liquid being exposed to ambient conditions, and
gives up heat during passage over said disc,
and means for removing said liquid from the periphery of said disc.
9. The invention as set forth in claim 8 in which said last mentioned means includes pick-up portions extending into a collector ring at the outer periphery of said disc so as to return cooled fluid to said heat exchanger.
10. The radiator of claim 1 wherein said liquid has relatively low vapor pressure and low viscosity at temperature of operation.
11. The radiator of claim 10 wherein said liquid is an oil.

References Cited
UNITED STATES PATENTS

| | | | |
|---|---|---|---|
| 1,462,321 | 7/1923 | Burnham | 165—106 X |
| 2,680,007 | 6/1954 | Arbuckle | 165—86 X |
| 2,799,259 | 7/1957 | Farny et al. | 165—86 X |
| 3,089,318 | 5/1963 | Hebeler | 165—134 |
| 3,174,537 | 3/1965 | Meyer | 165—133 X |

ROBERT A. O'LEARY, *Primary Examiner.*

M. A. ANTONAKAS, *Assistant Examiner.*

UNITED STATES PATENT OFFICE
CERTIFICATE OF CORRECTION

Patent No. 3,363,676            January 16, 1968

Frank B. Hunter, Jr.

It is certified that error appears in the above identified patent and that said Letters Patent are hereby corrected as shown below:

Column 1, line 22, "2,158,198" should read -- 3,158,198 --; line 23, "invention" should read -- inventor --. Column 6, line 28, between "heat" and "utilizing" insert -- exchanger --.

Signed and sealed this 12th day of August 1969.

(SEAL)

Attest:

Edward M. Fletcher, Jr.            WILLIAM E. SCHUYLER, JR.

Attesting Officer            Commissioner of Patents